(12) United States Patent
Itzler et al.

(10) Patent No.: US 10,147,301 B2
(45) Date of Patent: *Dec. 4, 2018

(54) INTELLIGENT WIRING DEVICES

(71) Applicant: Hubbell Incorporated, Shelton, CT (US)

(72) Inventors: Roy J. Itzler, Orange, CT (US); Thomas L. Scanzillo, Monroe, CT (US); Shadi A. AbuGhazaleh, Guilford, CT (US); Michael K. Williams, Watertown, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/449,517

(22) Filed: Mar. 3, 2017

(65) Prior Publication Data

US 2017/0270769 A1    Sep. 21, 2017

Related U.S. Application Data

(63) Continuation of application No. 15/072,672, filed on Mar. 17, 2016, now Pat. No. 9,792,805.

(60) Provisional application No. 62/134,398, filed on Mar. 17, 2015, provisional application No. 62/273,901, filed on Dec. 31, 2015.

(51) Int. Cl.
| | | |
|---|---|---|
| *G08B 1/00* | (2006.01) | |
| *G08B 21/18* | (2006.01) | |
| *G05F 1/66* | (2006.01) | |
| *H02J 3/12* | (2006.01) | |
| *H02J 3/18* | (2006.01) | |
| *H04W 84/18* | (2009.01) | |
| *G05F 1/46* | (2006.01) | |
| *H02J 13/00* | (2006.01) | |

(52) U.S. Cl.
CPC ............. *G08B 21/185* (2013.01); *G05F 1/46* (2013.01); *G05F 1/66* (2013.01); *G08B 21/182* (2013.01); *H02J 3/12* (2013.01); *H02J 3/18* (2013.01); *H04W 84/18* (2013.01); *H02J 13/0075* (2013.01); *Y02E 60/7853* (2013.01); *Y04S 40/126* (2013.01)

(58) Field of Classification Search
CPC ....... G08B 21/185; G08B 21/182; G05F 1/46; G05F 1/66; H02J 3/12; H02J 3/18; H04W 84/18
USPC ............... 340/539.1, 539.11, 539.13, 539.24
See application file for complete search history.

(56) References Cited

U.S. PATENT DOCUMENTS

| | | | | |
|---|---|---|---|---|
| 5,959,529 | A * | 9/1999 | Kail, IV | .................. G01S 19/17 128/903 |
| 9,792,805 | B2 * | 10/2017 | Itzler | .................... G08B 21/185 |
| 2009/0045803 | A1 | 2/2009 | Schoettle | |

(Continued)

FOREIGN PATENT DOCUMENTS

WO     2014031798 A2    2/2014

*Primary Examiner* — Daryl Pope
(74) *Attorney, Agent, or Firm* — Dickinson Wright, PLLC

(57) ABSTRACT

A system for monitoring parameters of load equipment is provided. A power connector is provided with intelligence, at least one sensor, and a wireless communication component. The power connector is capable of monitoring physical parameters measured by the at least one sensor, such as voltage, current, temperature, and moisture. The system can further provide an alarm if the sensed parameter falls out of a predetermined range.

32 Claims, 18 Drawing Sheets

(56) References Cited

U.S. PATENT DOCUMENTS

| | | |
|---|---|---|
| 2011/0095608 A1 | 4/2011 | Jonsson et al. |
| 2011/0298301 A1 | 12/2011 | Wong et al. |
| 2012/0109398 A1 | 5/2012 | Bhakta |
| 2014/0005809 A1 | 1/2014 | Frei et al. |
| 2015/0057825 A1 | 2/2015 | Steele et al. |
| 2015/0042324 A1 | 12/2015 | Noriaki et al. |

* cited by examiner

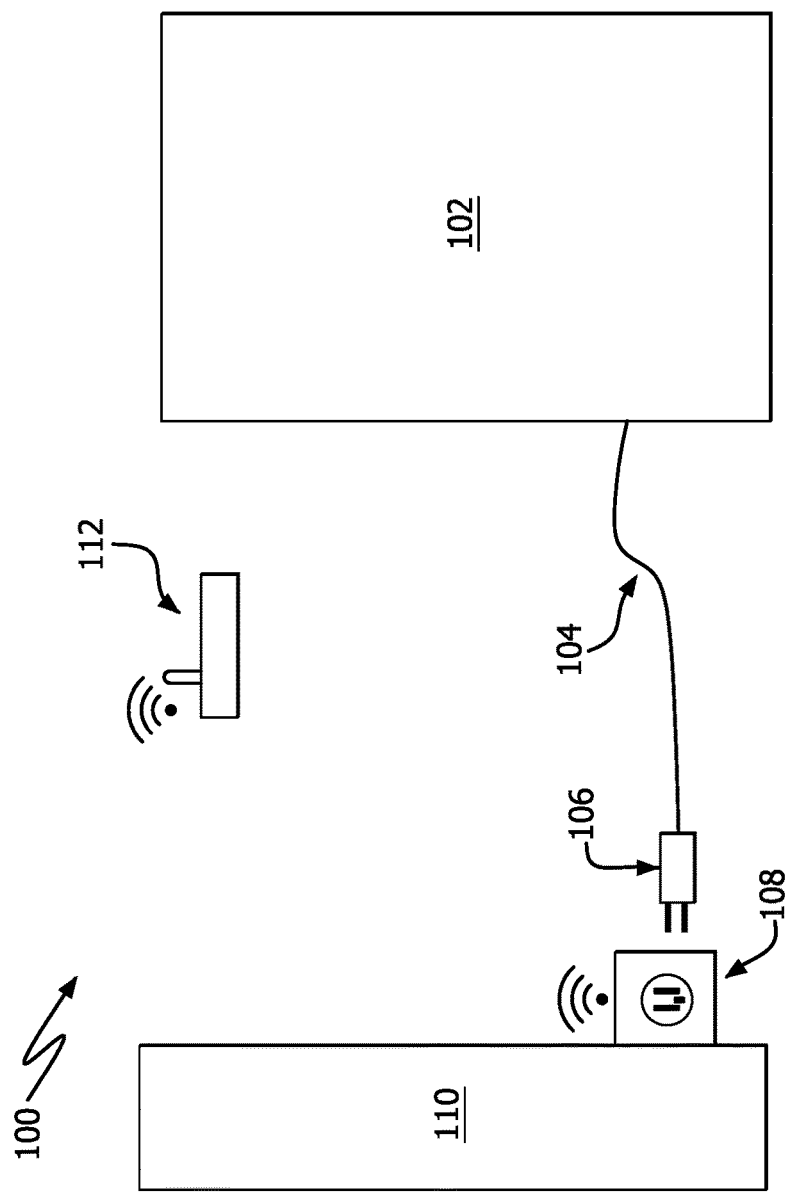

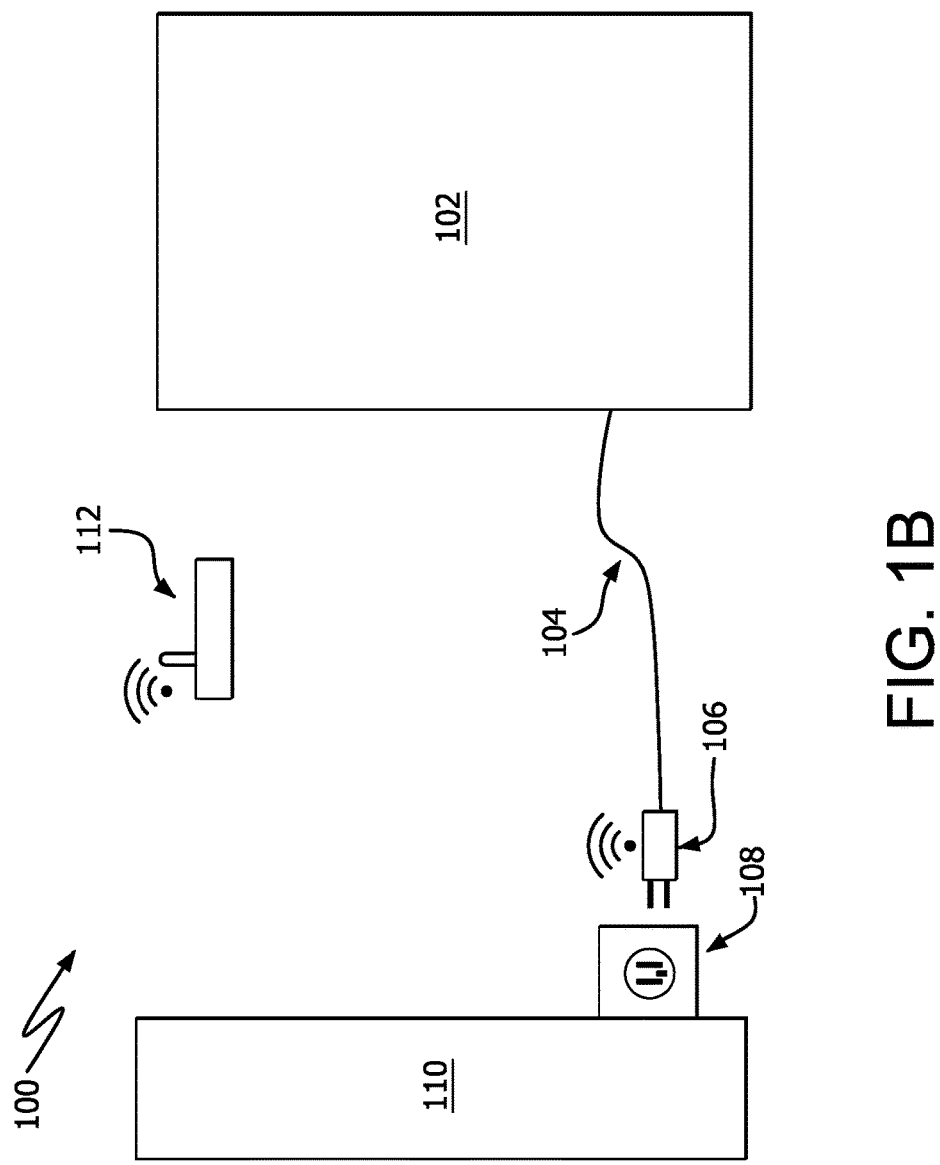

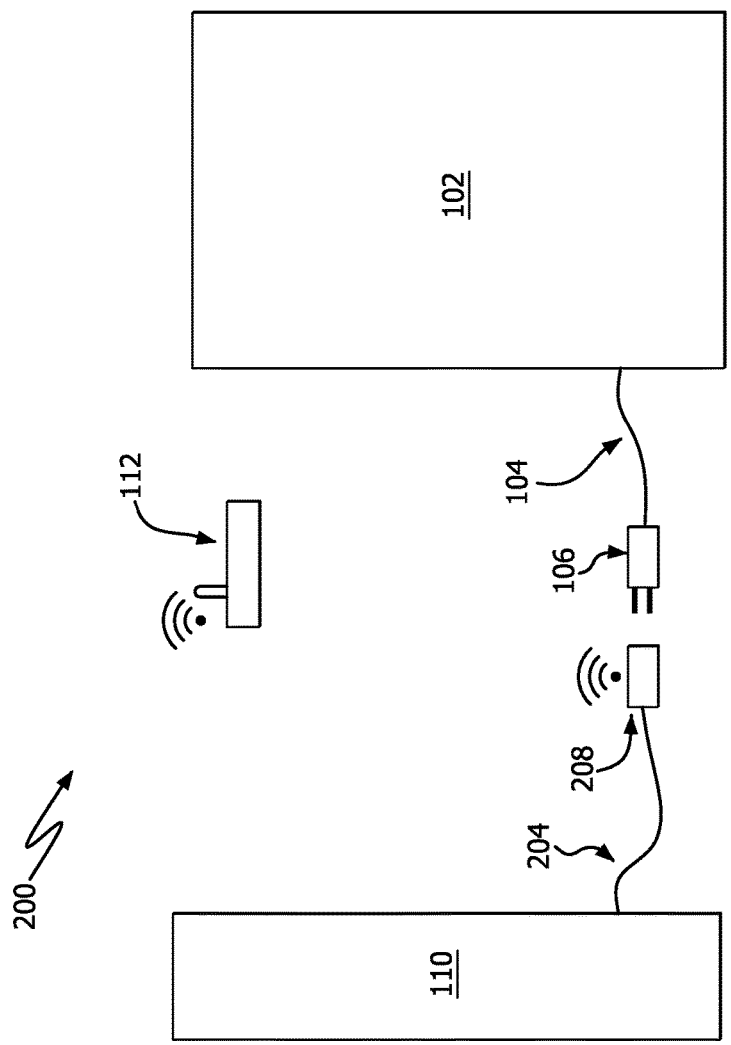

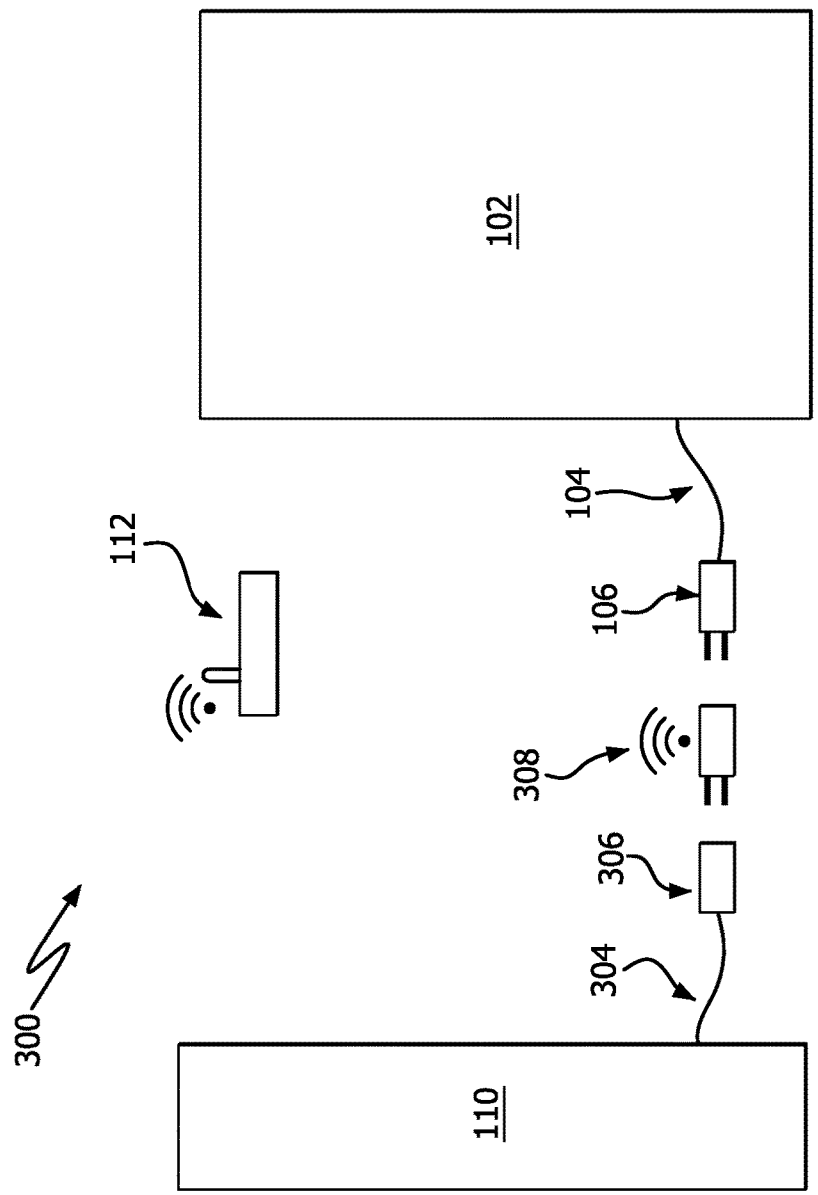

Device #0001
Monitoring Ranges

Temperature Range: [  ] to [  ]
Voltage Range: [  ] to [  ]
Current Range: [  ] to [  ]
Power: [  ] to [  ]
Power Factor: [  ] to [  ]

FIG. 7A

Device #0001 Status

Temperature: 72F (22C)

Voltage: 218V

Current: 15.4A

Power: 3.3kW

Power Factor: 98

FIG. 8

INTELLIGENT WIRING DEVICES

CROSS REFERENCE TO RELATED APPLICATIONS

This application is a continuation of U.S. Non-Provisional patent application Ser. No. 15/072,672, filed Mar. 17, 2016, and claims the benefit under 35 U.S.C. § 119(e) of U.S. Provisional Patent Application Nos. 62/134,398 filed Mar. 17, 2015, and 62/273,901 filed Dec. 31, 2015, the entire contents of which are hereby incorporated by reference.

FIELD OF THE INVENTION

The present invention relates to systems and methods for connecting power supplies to equipment. More particularly, the present invention relates to devices that provide an electrical wiring connection to a load, monitor parameters of the load with sensors, and transmit information regarding the monitored parameters to a monitoring device.

BACKGROUND OF THE INVENTION

Electrical connectors are used to facilitate electrical connectivity between power supplies and utilization equipment. Where it is not feasible to hard wire equipment, detachable connections are used to facilitate maintenance disconnecting, equipment movement, additions and changes. There are also code requirements to provide disconnect switches for motor loads.

Installations of detachable connections (devices) are subject to installer variability as well as degradation over time due to thermal cycling and material wear. When devices wear beyond the manufacturer's specifications or when an installation is not completed to manufacturers specifications by, for example applying improper torque to terminal screws, there exists a possibility that the device will fail while in use, thereby disrupting the flow of electricity to the utilization equipment causing the equipment to stop functioning.

Depending on the type of equipment, the cost of downtime can range up to thousands of dollars per minute. Computer servers and manufacturing equipment, for example, require reliable uptime. As one example, data centers require superior integrity in the electrical power connection to server equipment, and typically use TwistLock® or Pin and Sleeve connectors. The servers run 24 hours per day and seven days per week and draw significant current. Currently, in such critical environments, maintenance personnel walk around and check power connections with an IR gun to determine if any connections are overheating. Moreover, excess heat generated by power connections contribute to the specific AC equipment and other operating costs. Accordingly, for the equipment owner, the ability to avoid costly downtime, lessen AC and operating costs, and minimize maintenance costs, would be highly beneficial.

SUMMARY OF THE INVENTION

The above described disadvantages are overcome or minimized and the above and other advantages are realized by embodiments of the present invention. An aspect of the invention is to provide electrical devices (connectors, receptacles, plugs, inlets) that have imbedded sensing ability to monitor and detect operating parameters that could be predictors of impending performance issues. Operating parameters would include, but not be limited to, amperage, voltage, temperature, on/off status and water ingress (moisture detection). By monitoring these parameters, the connective device would now have the "intelligence" to convey information to a responsible party regarding possible disruptions in service, allowing the responsible party to take proactive steps to correct the problem and avoid the costly downtime situation.

Each device would preferably be considered a point on a network and have the ability to wirelessly transmit data across the network to a central monitoring point. Preferably, the network would be a wireless mesh type network that would be compatible in a commercial/industrial environment and would have the ability to transmit real time data.

Data would preferably be received at a central collection point and be displayed in a way that indicated whether or not the captured data is within pre-defined operating parameters. The collection point preferably has the ability to report data in real time or at varying intervals that could include hourly, daily, weekly, and so on. The collection point preferably has the ability to accept any number of devices at one time.

Another aspect of the invention is to embed sensing technology into a conventional electrical wiring device so that the wiring device does not necessarily look appreciably different from a passive device. Intelligent devices can be used in new installations, or retrofit installations. Where passive devices already exist and it is undesirable to remove them, an intelligent adapter could be added to the circuit to achieve the benefit.

BRIEF DESCRIPTION OF THE DRAWINGS

The above and other exemplary features and advantages of certain exemplary embodiments of the present invention will become more apparent from the following description of certain exemplary embodiments thereof when taken in conjunction with the accompanying drawings, in which:

FIGS. 1A and 1B illustrate a load connected to a power connector according to a first exemplary embodiment of the invention;

FIG. 2 illustrates a load connected to a power connector according to a second exemplary embodiment of the invention;

FIG. 3 illustrates a load connected to a power connector according to a third exemplary embodiment of the invention;

FIGS. 7A and 7B are an exemplary user interface for setting alarm ranges according to an exemplary embodiment of the invention;

FIG. 8 is an exemplary user interface for providing current status of a device according to an exemplary embodiment of the invention.

Throughout the figures, like reference numbers will be understood to refer to like elements, features and structures.

DETAILED DESCRIPTION OF EXEMPLARY EMBODIMENTS

Figure 4:
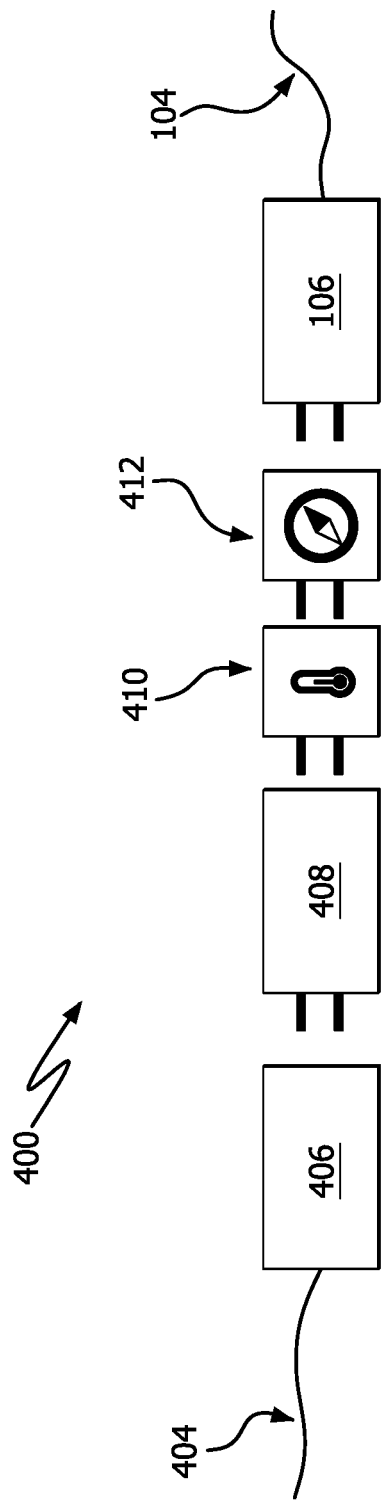
FIG. 4 illustrates a set of modules connected in-line according to an embodiment of the invention.

A detailed description of exemplary embodiments will now be provided in connection with the attached drawing figures. FIG. 1A illustrates a system according to a first embodiments of the invention. Load equipment 102 is powered by a power cable 104 having a power plug at a distal end 106. Power plug 106 plugs into a power receptacle 108 of a facility 110. The plug 106 is illustrated disconnected for ease of viewing, but it will be understood that in operation, plug 106 would be plugged into receptacle 108. Unlike conventional power receptacles, power receptacle 108, according to an exemplary embodiment of the invention includes wireless communication capability. The wireless communication may be IEEE 802.11 wifi, or Blutooth, or any other suitable wireless communication protocol. Receptacle 108 preferably communicates with a wireless access point 112, or the like, or order to communicate to and from remote devices. The receptacle 108 also includes one or more sensors and a microprocessor to receive information from the sensors, and to communicate the information via wireless communication to the wireless access point 112. The sensors preferably sense physical parameters of the receptacle, such as voltage, current, phase, power consumption, temperature, locations, moisture, and any other parameters capable of being sensed. As illustrated in FIG. 1B, the wireless communication component may alternately be incorporated into the plug 106 of the load 102, rather than in the receptacle 108 of the facility 110. In the embodiments that follow, it should be understood that the sensing and communication components could be incorporated into any element in the chain between load and facility. That is, where the sensing and communication components are shown in the receptacle, such as in FIG. 2, one of ordinary skill in the art will appreciate that it is contemplated to be within the scope of the present invention to instead incorporate the components into the plug.

FIG. 2 illustrates a second embodiment of the invention. The system 200 of FIG. 2 is substantially the same as FIG. 1, except that the fixed power receptacle 108 is replaced with a power supply cable 204 connected to a connector 208. In this embodiment, the connector contains the same or similar components as the fixed receptacle 108 of FIG. 1, except that receptacles are contained in an enclosure, such as a typical 2"×4" box common in industrial settings.

It should be appreciated that in any embodiment, the power connection means, that is the plug type, may be conventional straight plug blades, a TwistLock® connector, a pin and sleeve connector, or any other suitable physical connection means.

FIG. 3 illustrates a third embodiment of the invention. This system 300 is similar to the embodiments described above, except that both the load plug 106, and the power supply cable 304 and connector 306 are conventional. An add-on module 308 serves as a pass-through for power, and plugs into the receptacle 306. The plug 106 in turn plugs into the add-on module 308. The add-on module preferably contains the same or a similar set of components as the receptacles and connectors described above. That is, the module 308 preferably comprises a wireless communication component and one or more sensors for providing information on physical parameters such as voltage, current, phase, temperature, location, etc. to a microprocessor, so that the microprocessor may provide the information to remote devices via wireless communication. Of course it will be appreciated and understood that the add-on module 308 could be used with a fixed receptacle such as the one illustrated in FIG. 1, or any other suitable receptacle.

FIG. 4 illustrates a fourth embodiment of the present invention. The system 400 of FIG. 4 is modular in nature. That is the wireless component and a first sensor or set of sensors are included in the intelligent wiring device 408. Wiring device 408 may, for example, include voltage, current, and phase sensors, as well as a wireless communication component. The system of FIG. 4 is modular, however, in that additional modules may be added in-line, as needed, to add additional capabilities, such as additional sensors. As illustrated, temperature module 410, plugs into intelligent wiring device 408, and GPS location module 412 plugs into the temperature module 410. Finally, the plug 106 connected to the load equipment plugs into the last module in line, in this case the GPS module 412. Each of the modular devices preferably may be connected in any order. Moreover, communication between modules may be made via the high voltage conductors, additional low-voltage conductors with mating connectors between modules, or by wireless communication between modules, or between any module and a remote access point. In this manner, sensing capabilities may be added over time as needed, and cost for the monitoring equipment may be minimized since each module need not individually have every type of sensing available.

Figure 5:
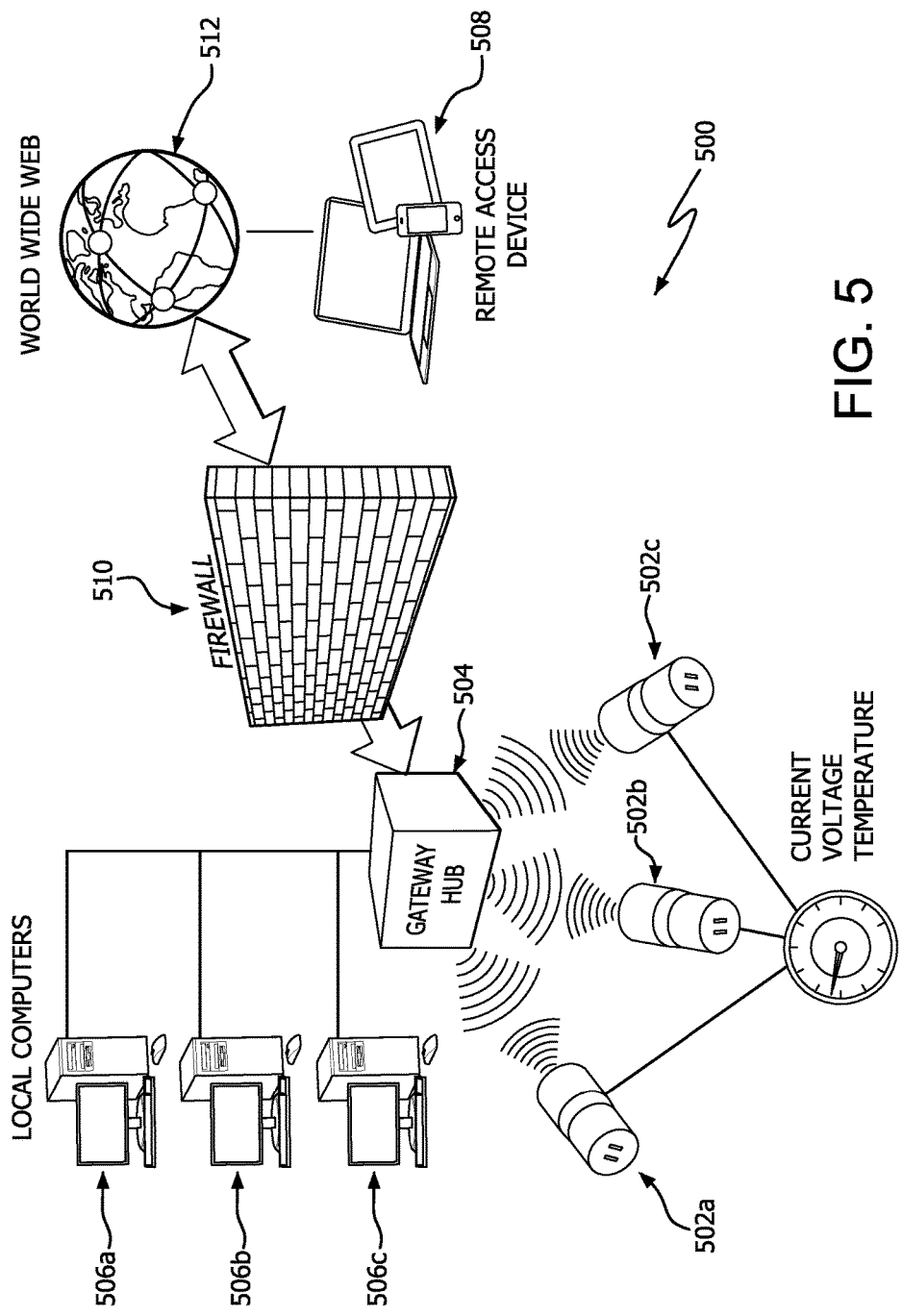
FIG. 5 illustrates a system including multiple power connectors and a central monitoring hub according to an exemplary embodiment of the invention.

FIG. 5 illustrates a system according to an exemplary embodiment of the present invention. As shown, multiple intelligent wiring devices 502a, 502b, 502c, similar to those described above, provide power connection, sensing and wireless communication capability to various pieces of equipment connected to them. As illustrated each of the intelligent wiring devices 502a, 502b, 502c, communicates wirelessly with a gateway hub 504. The gateway hub 504 in turn provides communication access to local computers 506a, 506b, 506c, and remote devices 508 via a firewall 510 and the world wide web 512. In this manner, the intelligent wiring devices 502a, 502b, 502c may advantageously be monitored locally or from anywhere in the world.

Figure 6:
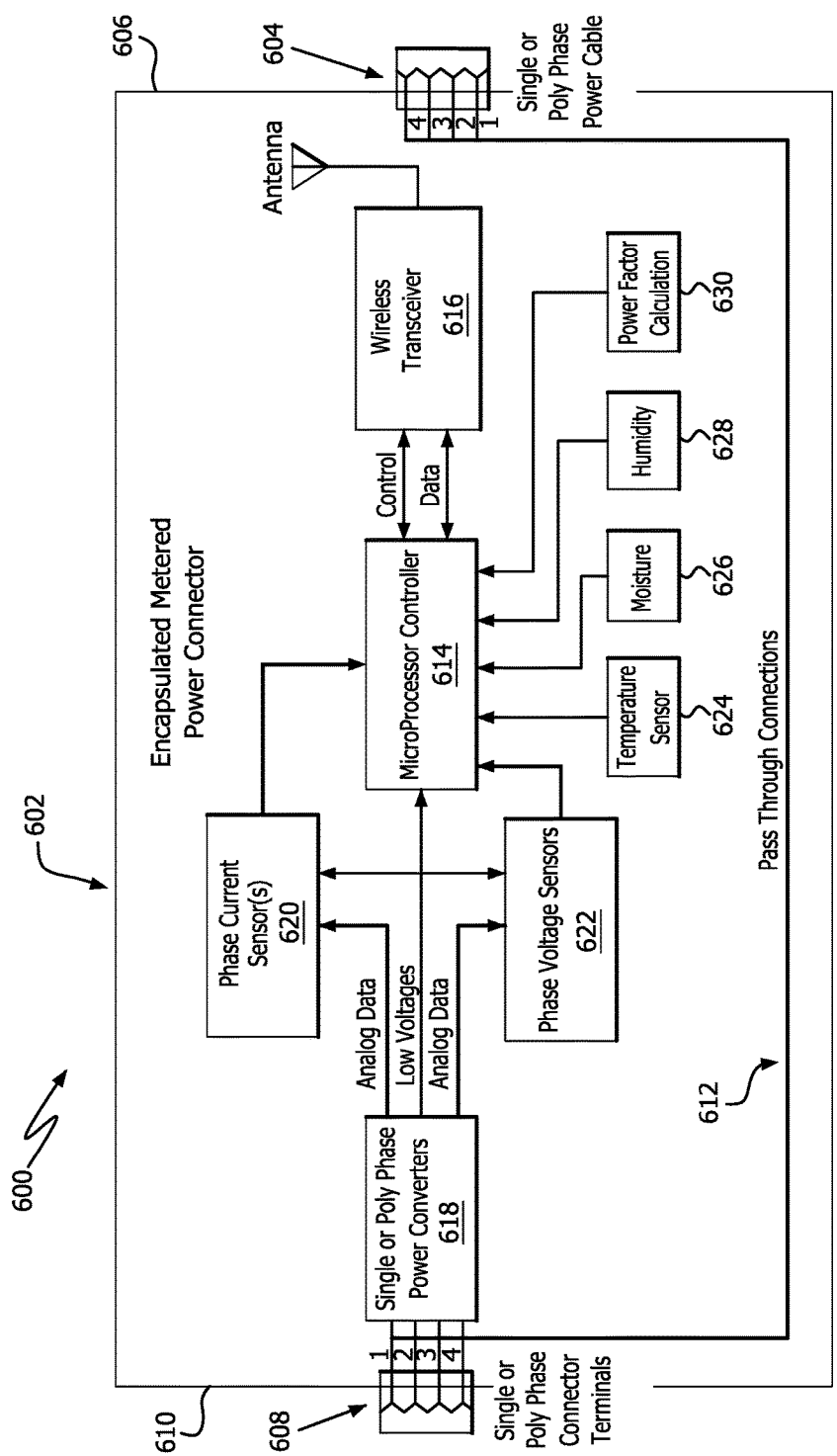
FIG. 6 is a component diagram of an exemplary power connector according to an embodiment of the invention.

FIG. 6 illustrates a component diagram of an exemplary embodiment of the invention. Device 600 comprises a housing 602 with a power cable 604 entering a proximal end 606 of the housing 602, and a set of receptacle terminals 608 corresponding to the conductors of the power cable 604 at a distal end 610 of the housing 602. A set of pass through conductors 612 are provided inside the housing between the power cable 604 and the receptacle terminals 608. The device 600 further comprises a microprocessor 614, a wireless communication component 616, and a power converter 618. The device 600 also includes sensors such as current sensor 620, voltage sensor 622, temperature sensor 624, moisture sensor 626, humidity sensor 628, and power factor calculation 630. The power converter 618 preferably provides conditioned dc voltage to the microprocessor 614 and other low voltage components of the device 600. The power converter 618 can also provide analog signals to the current and voltage sensors 620, 622 to provide information on the power provided to load equipment (not shown).

In the examples provided above, several examples of embodiments of the invention were described, but it should be appreciated that many changes may be made without departing from the invention. For example, the wireless components need not communicate with a single access point in infrastructure mode, but rather may freely communicate with any other wireless devices or network such as a self-healing mesh, using any communication protocol.

Each device preferably has a device ID, and communicates the device ID across the network environment, either during provisioning, as needed, or in any other suitable manner.

Devices according to exemplary embodiments may be programmed to monitor ranges of parameters related to the sensed physical state, such as voltage, current, temperature, and so on. Devices are preferably programmable by the remote monitoring equipment, such as local computers 506a, 506b, 506c or remote access device 508 as shown in FIG. 5.

Figure 7B:
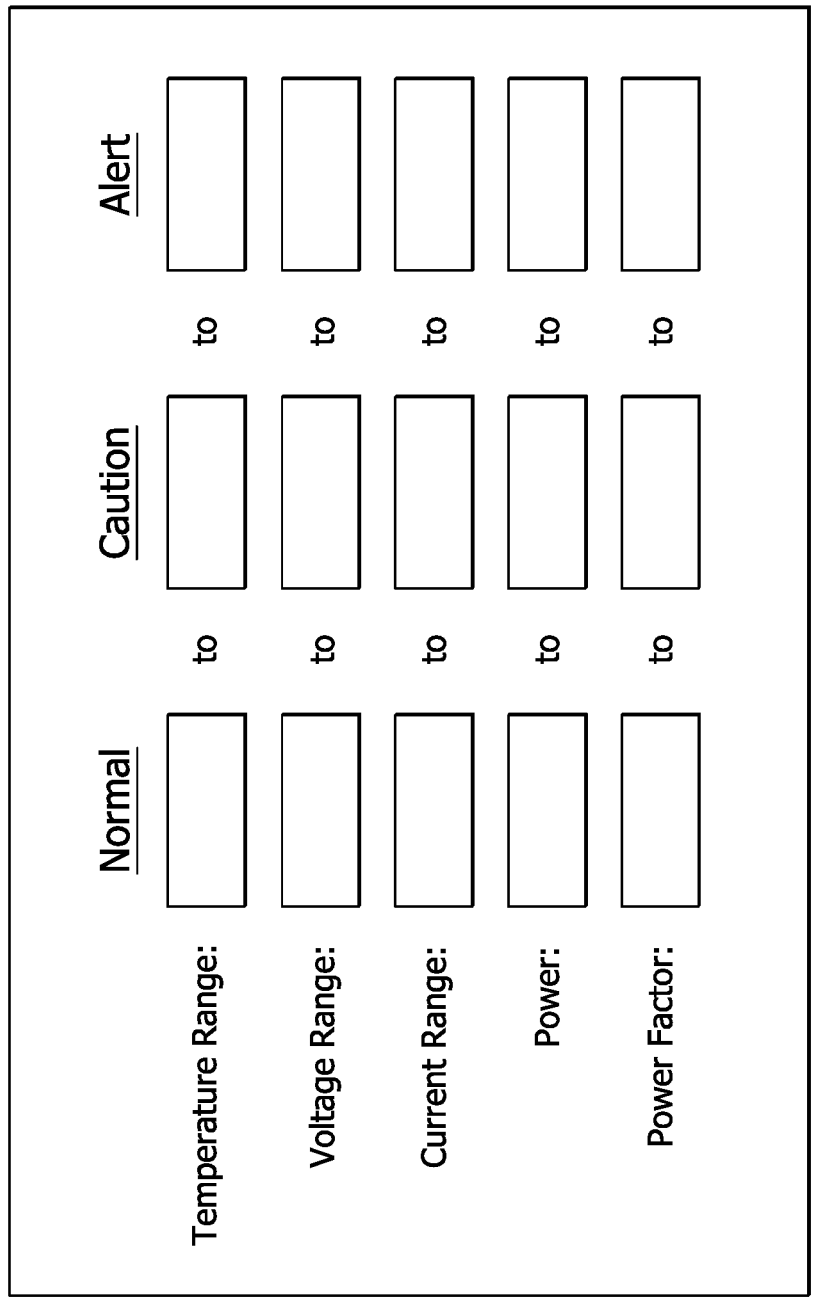

In a preferred embodiment, each device, such as the multiple device 502a, 502b, 502c provide a user interface that is remotely addressable, such as by incorporating a web server into the microprocessor and wireless communication component. In this manner, parameter and alarm ranges may be monitored and set. FIG. 7A illustrates an exemplary user interface provided by device 600 to a remote device such as remote access device 508 for setting the ranges of temperature, voltage, current, power, power factor, and any other suitable parameter to be monitored. This interface permits users to enter a "normal range" for various parameters. The device can provide an alert if any range deviates from the defined normal range. The defined ranges can of course be more granular than illustrated in FIG. 7A. As one example, FIG. 7B illustrates another user interface that permits "normal", "caution" and "alert" ranges to be set for each parameter. The user interface and parameter ranges can be as simple or as sophisticated as needed, and are not limited to the specific embodiments illustrated in FIGS. 7A and 7B. Furthermore, alert levels may be dynamic. That is, for example, alert levels may be set automatically according to measured normal operating levels. In this manner, "normal" levels can be determined according to the environment in which a device is deployed. As an example, an exemplary embodiment of the present invention could set a normal temperature range based on measured temperatures over an initial period of time. This temperature would depend on the ambient temperature where the device is deployed. The device would then be able to detect a deviation from normal operating temperature without requiring the "normal range" for temperature to be set by a user. Devices in hot environments would automatically set a higher "normal range" for temperature, for example, than devices deployed in a cool environment. Preferred embodiments of the present invention will sense changes in the sensed parameters, and provide alerts based on a level of change from normal of a particular parameter.

It should be appreciated that any parameter of interest that can be sensed could be incorporated into a device according to an exemplary embodiment of the invention. Additional parameters that could be incorporated into an exemplary device include, but are not limited to, humidity, moisture, ambient temperature, strain, stress, deflection, noise, power quality, total harmonic distortion, device status (on/off), device status (engaged/disengaged), end of life indication, lifetime on duration, number of cycles, location, device ID, battery status, and so on.

Figure 9:
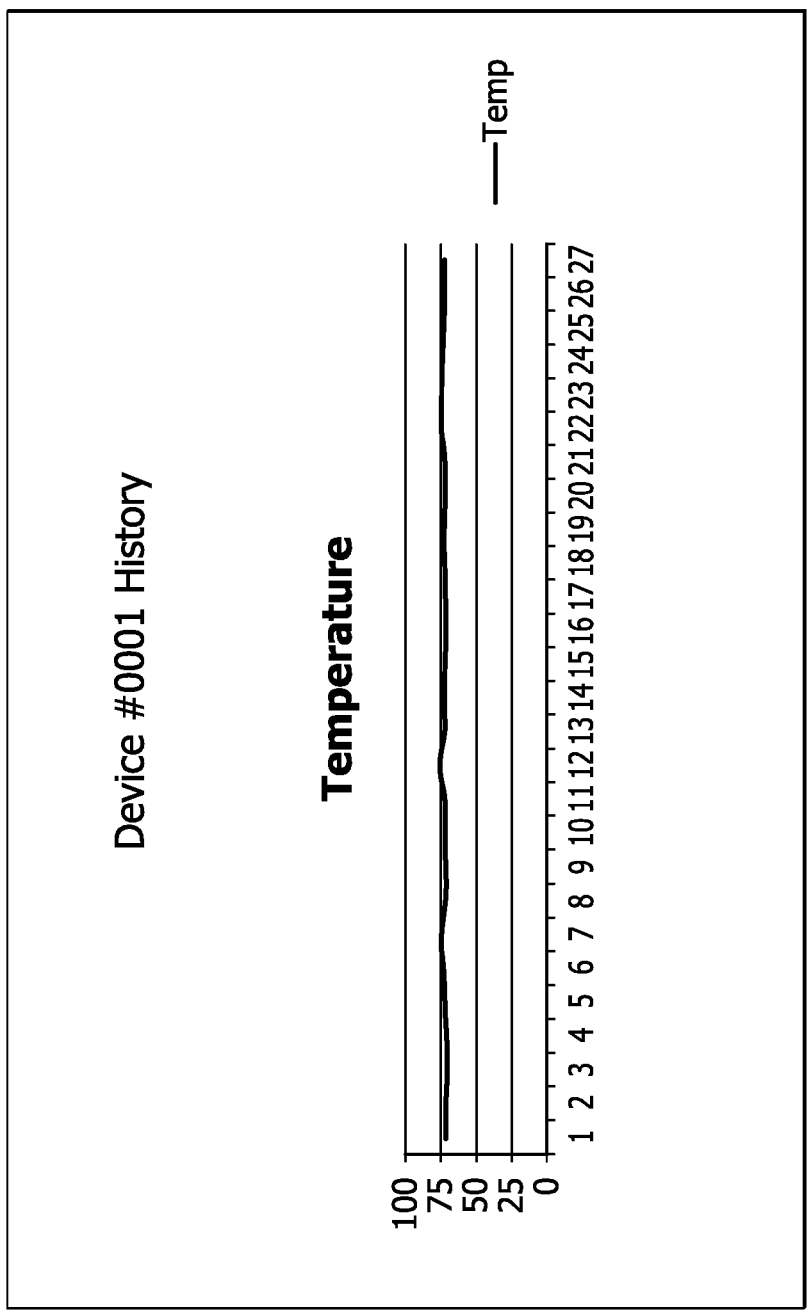
FIG. 9 is an exemplary user interface for providing historical sensor data according to an exemplary embodiment of the invention.

FIG. 8 illustrates an exemplary user interface provided by device 600 for illustrating the present state of device 600, including the present temperature, voltage and current. FIG. 9 illustrates an exemplary user interface provided by device 600 for illustrating historical data. The illustrated data is temperature data, but one of ordinary skill in the art will appreciate that any historical sensor data may be included in one or more historical charts.

The microprocessor is preferably programmed to monitor the sensor information received from each sensor, and to generate an alarm if the sensor information falls out of range. The alarm may be indicated on the device itself, such as a visible or audible alarm, or may be communicated to a remote device via the wireless communication component.

Figure 14:
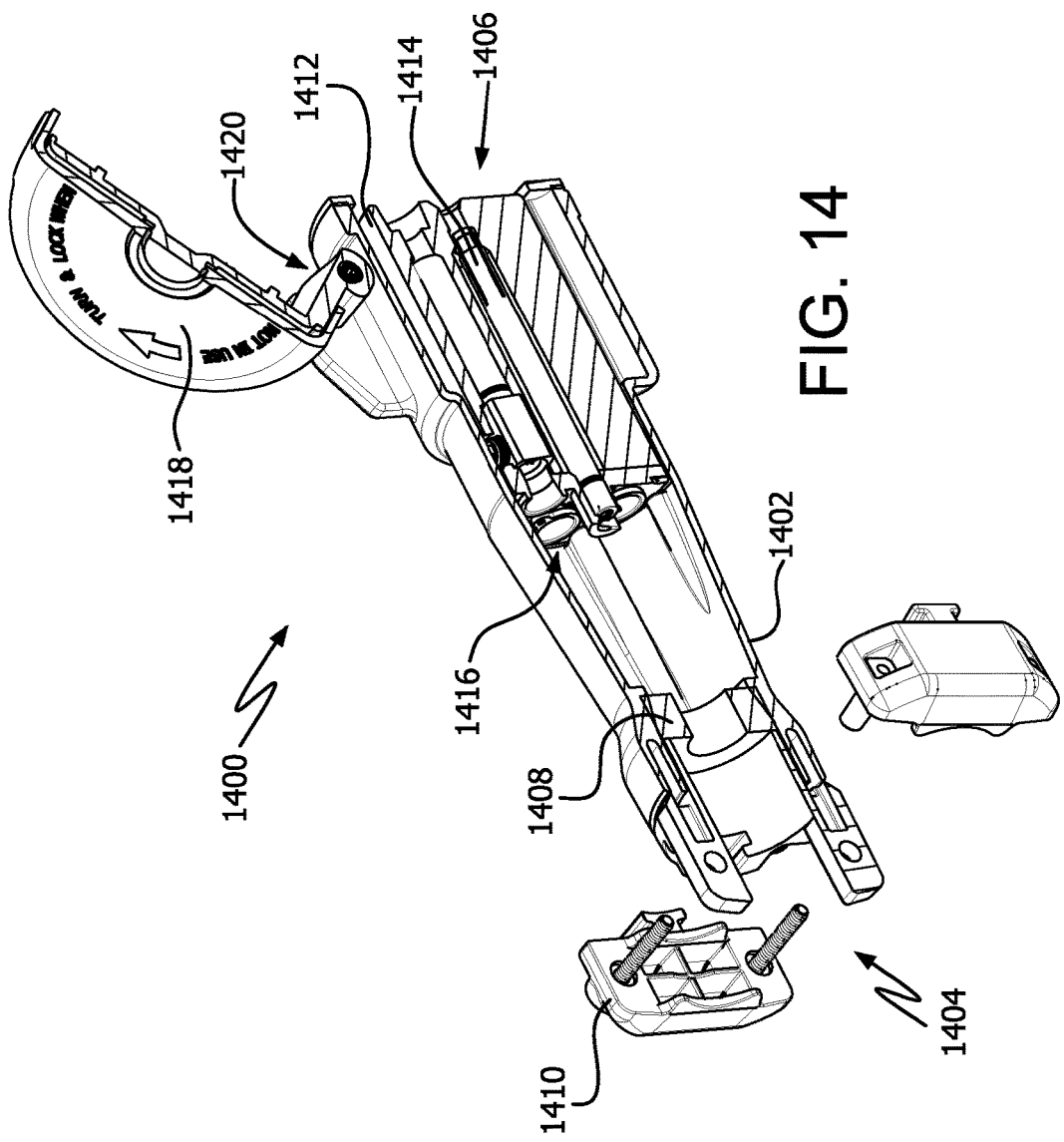
FIG. 14 is a cutaway view of an exemplary embodiment of the invention.
Figure 15:
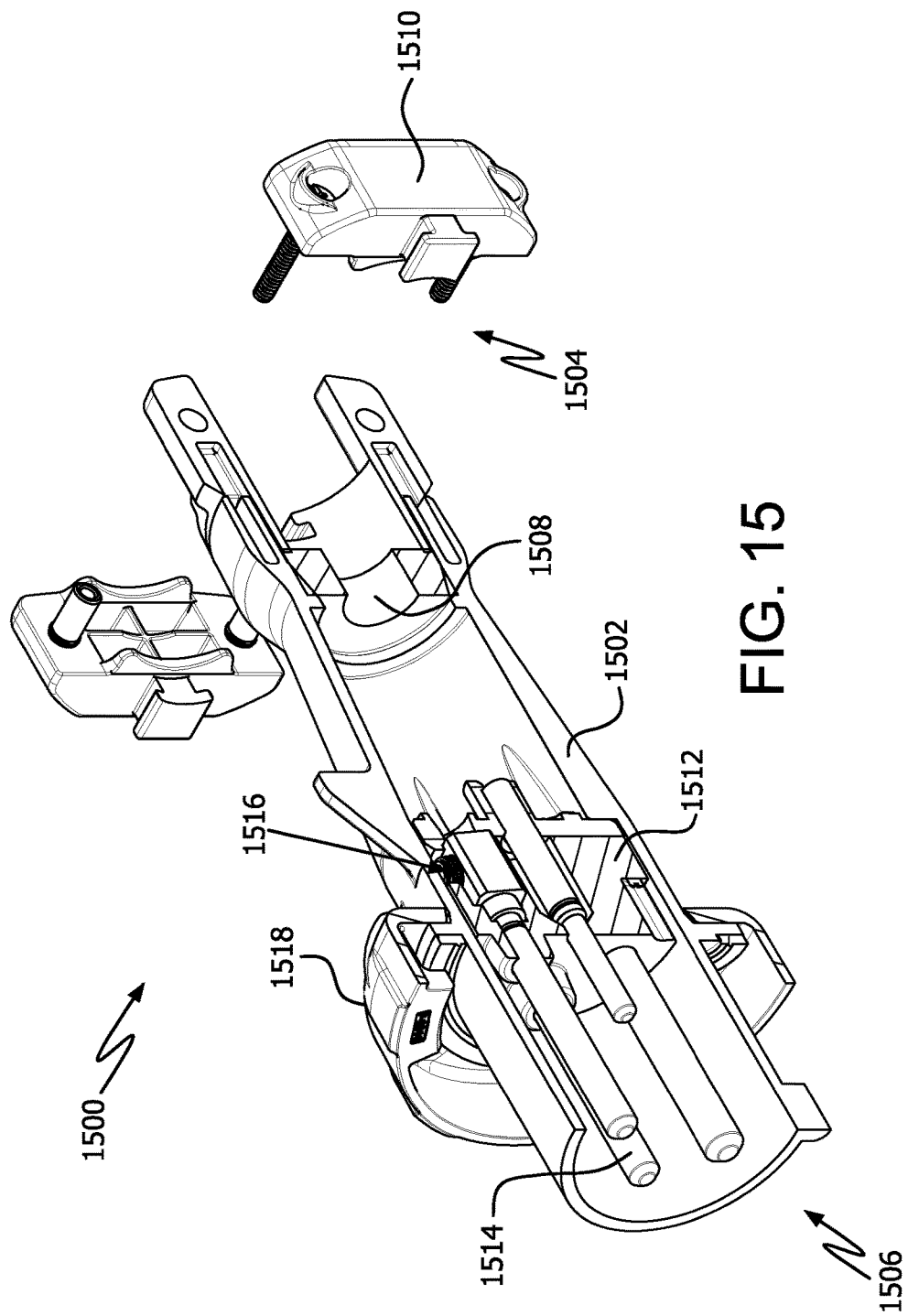
FIG. 15 is a cutaway view of a complementary connector according to an exemplary embodiment of the invention.

FIGS. 10-13 illustrate an exemplary embodiment of the present invention. This embodiment provides an intelligent wiring device that fits within the housing of an electrical connector, such as a pin-and-sleeve connector. FIGS. 14-15 illustrate a conventional pin-and-sleeve connector to assist in understanding the embodiment of FIGS. 10-13. FIG. 14 illustrates a conventional female pin-and-sleeve electrical connector 1400. The female connector 1400 comprises a housing 1402. The housing 1402 is typically formed of insulated non-metallic material, and is preferably color coded by voltage for easy visual identification. The female connector 1400 comprises a proximal, or cable, end 1404, and a distal, or connector, end 1406. The proximal, cable end 1404 preferably includes a seal 1408 through which a cable (not shown) passes into the housing 1402. The proximal, cable end 1404 also preferably includes a strain relieving cable clamp 1410 to secure a conductor cable to the female connector 1400. The distal, connector end 1406 of the female connector 1400 comprises a contact arrangement 1412. Contact arrangement 1412 is secured within the housing 1402, and includes a plurality of conductor sleeves 1414 which are adapted to receive conductor pins from a male connector. The conductor arrangement 1412 also includes conductor receivers 1416 to receive and secure conductors of the cable to the conductor arrangement 1412. The female connector 1400 also preferably comprises a gasketed cover 1418 adapted to swivel about a hinge 1420 and seal the distal end 1406 of the female connector 1400 when the connector 1400 is not in use.

FIG. 15 illustrates a conventional male pin-and-sleeve electrical connector 1500. The male connector 1500 comprises a housing 1502. The housing 1502 is typically formed of insulated non-metallic material, and is preferably color coded by voltage for easy visual identification. The male connector 1500 comprises a proximal, or cable, end 1504, and a distal, or connector, end 1506. The proximal, cable end 1504 preferably includes a water tight seal 1508 through which a cable (not shown) passes into the housing 1502. The proximal, cable end 1504 also preferably includes a strain relieving cable clamp 1510 to secure a conductor cable to the male connector 1500. The distal, connector end 1506 of the male connector 1500 comprises a contact arrangement 1512. Contact arrangement 1512 is secured within the housing 1502, and includes a plurality of conductor pins 1514 which are adapted to be inserted into conductor sleeves from a female connector. The conductor arrangement 1512 also includes conductor receivers 1516 to receive and secure conductors of the cable to the conductor arrangement 1512. In the example shown, each conductor pin 1514 includes a set screw 1517 to clamp a conductor of the conductor cable within a hollow (not shown) of the pin 1514. The male connector 1500 also preferably comprises a gasketed sealing ring 1518 adapted to seal the distal end 1506 of the male connector 1400 in a watertight manner to a female connector 1400 when connected together.

Figure 10:
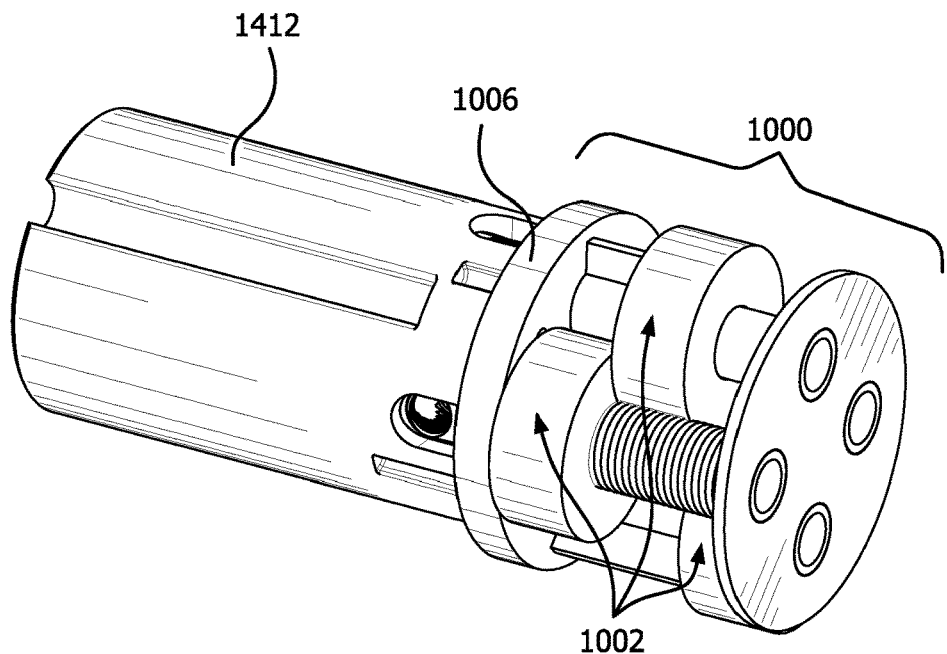
FIG. 10 is an isometric view of an exemplary embodiment of the invention.
Figure 11:
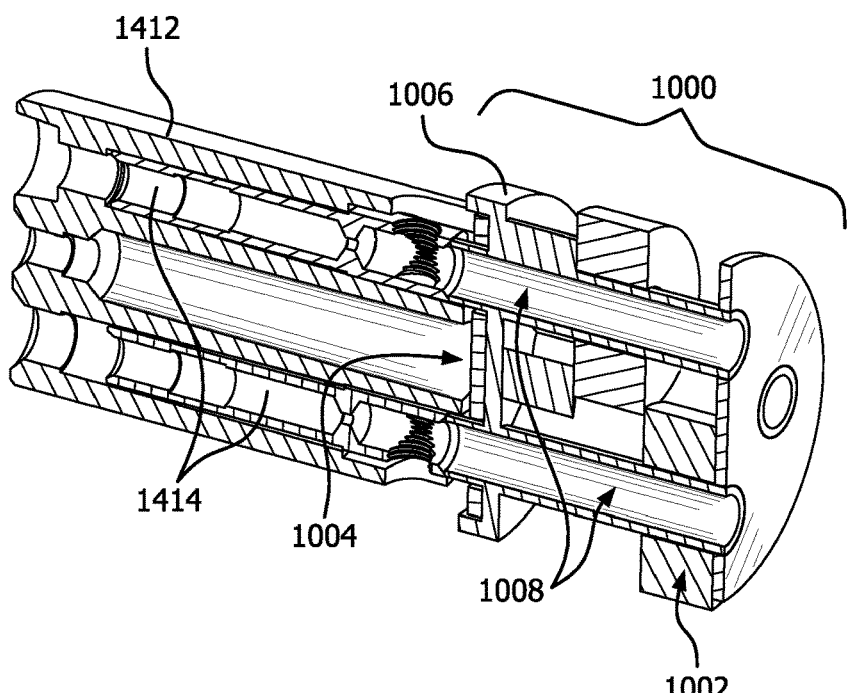
FIG. 11 is a cutaway view of the embodiment of FIG. 10.

FIG. 10 is a side view, and FIG. 11 is a cross-section view of an exemplary embodiment of the present invention that is a terminal extension sub-assembly 1000 adapted to fit within a housing of an electrical connector, such as the connectors 1400, 1500 described above. The terminal extension sub-assembly 1000 comprises current transformers 1002, a printed circuit board (PCB) 1004, and a terminal extension 1006. The terminal extension is preferably a molded non-conductive component, and includes terminal conduits 1008 that permit conductors to be passed through from the conductor cable to the conductor sleeves 1414. A set of current transformers 1002 are located on each phase conductor of the conductor cable. The current transformers 1002 permit measurement of current in each conductor. A current transformer is typically not needed for the ground conductor. Because the current transformers 1002 are relatively bulky components, they are arranged in a linearly stepped fashion, as illustrated, to minimize the width dimension of the connector housing. Accordingly, by arranging the current transformers 1002 in this manner, each current transformer is advantageously able to have an outer diameter corresponding to the distance between conductor conduits of the terminal extension sub-assembly. The terminal conduits correspond to each conductor receiver 1416, and the terminal extension sub-assembly is arranged proximally to the contact arrangement 1412.

Figure 12:
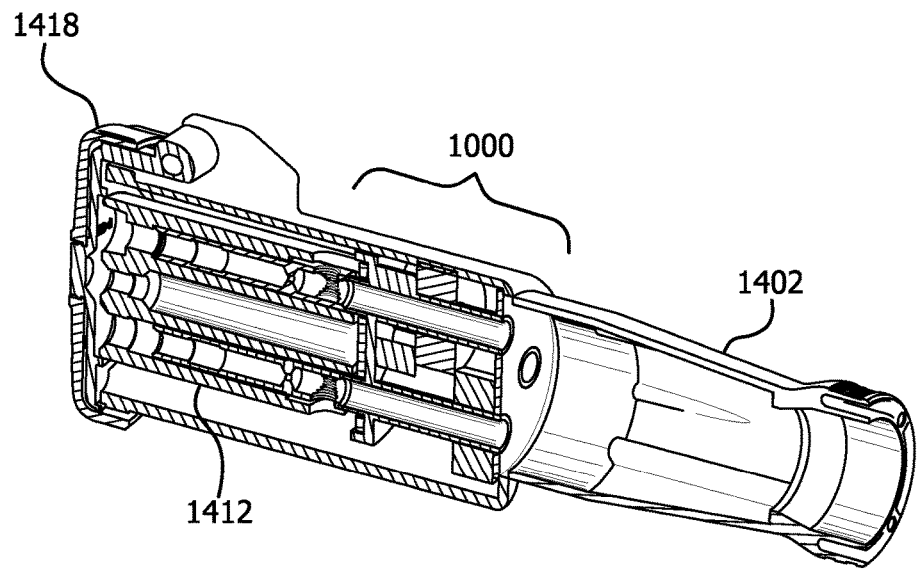
FIG. 12 is a cutaway view of another exemplary embodiment of the invention.
Figure 13:
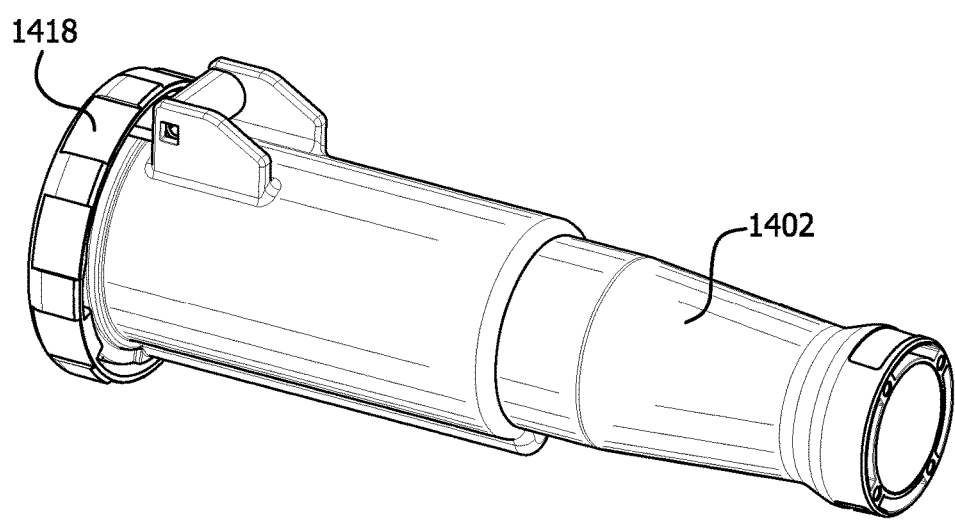
FIG. 13 is an isometric view of the embodiment of FIG. 12.

FIGS. 12 and 13 are cross sectional and side views, respectively, of an embodiment of the present invention showing the terminal extension sub-assembly 1000 within a connector housing 1402.

It should be appreciated that the pin-and-sleeve connectors illustrated above are merely exemplary, and embodiments of the present invention are suitable, and may be adapted for, any electrical connector pairing.

Figure 16:
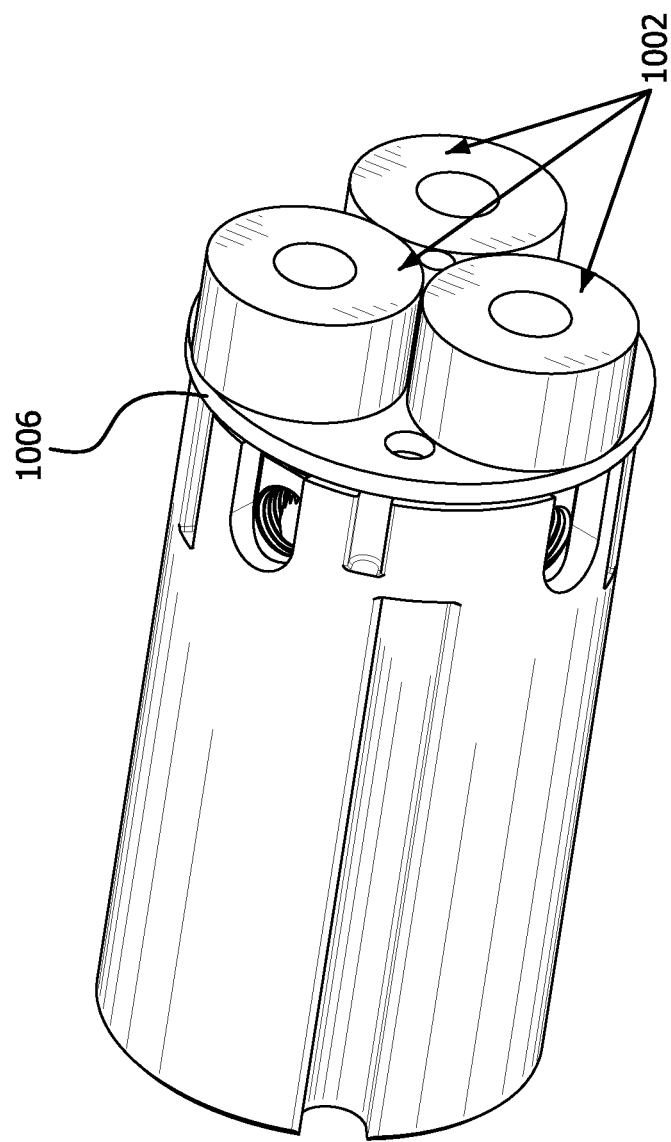
FIG. 16 is an isometric view of an embodiment of the invention having coplanar magnetic cores.

FIG. 16 illustrates an alternate arrangement wherein the current transformers 1002 are co-planar rather than linearly stepped. This arrangement may be preferably to minimize the length of a connector, where the width dimension is less critical.

Figure 17A:
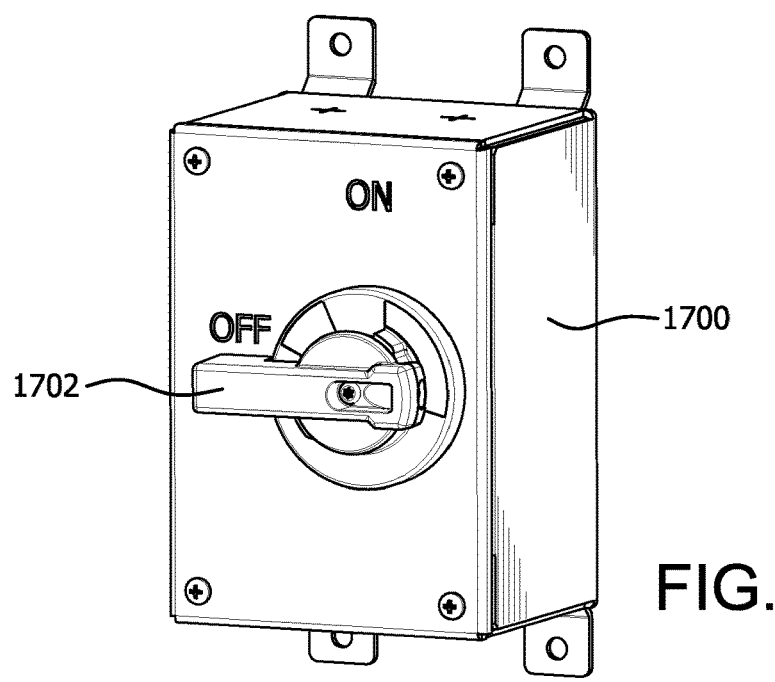
FIG. 17A-17E are exemplary views of equipment disconnects for use with an embodiment of the invention.
Figure 17B:
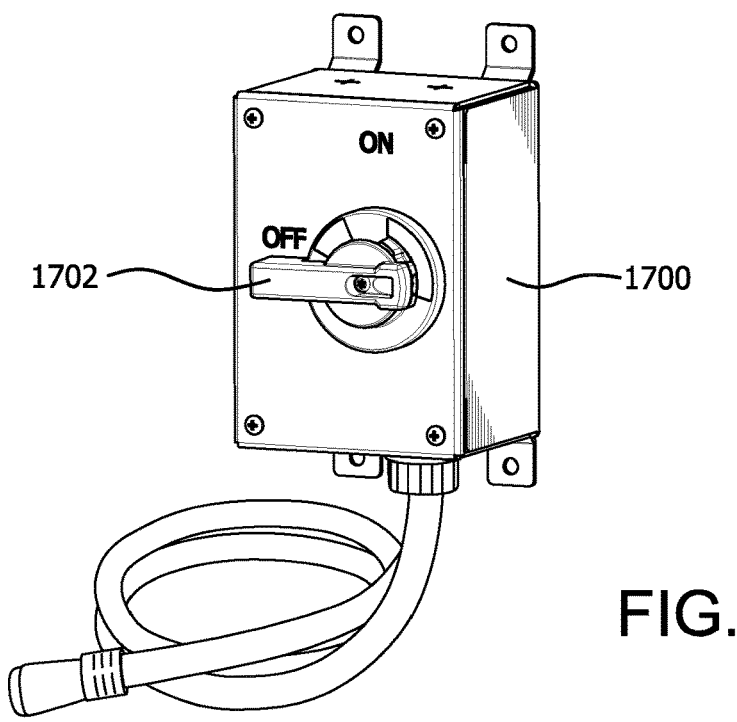
Figure 17C:
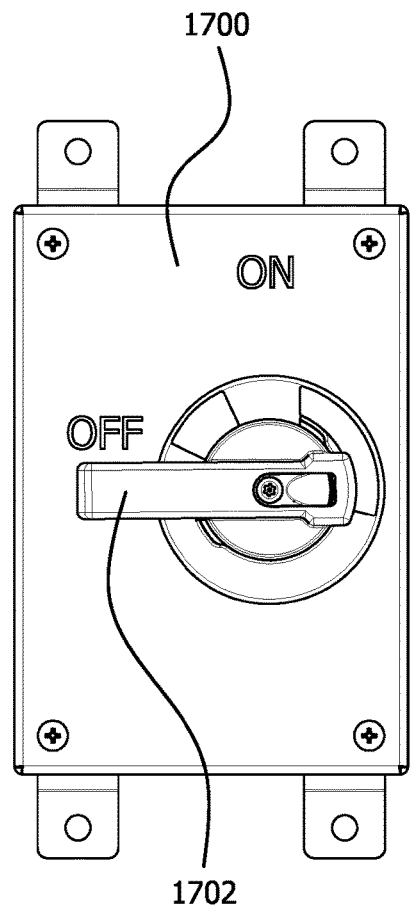
Figure 17D:
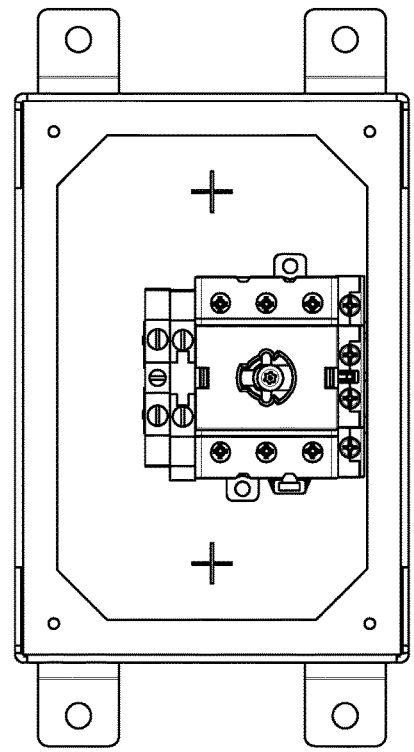
Figure 17E:
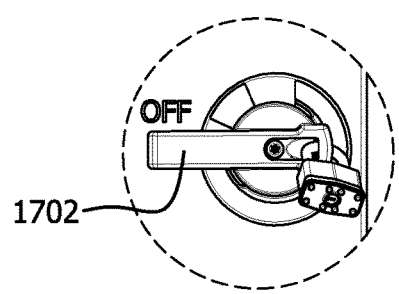

Embodiments of the present invention may be advantageously be incorporated into motor disconnect switches, such as those illustrated in FIGS. 17A-E. Such switches comprise a housing 1700 and a switch control lever to 1702 connect/disconnect a motor load. Embodiments of the present invention provide the above described PCB, sensing components, and wireless communication capabilities, preferably integrated within the housing of the motor disconnect switch. FIG. 17A illustrates a standalone motor disconnect switch. FIG. 17B illustrates a motor disconnect switch having a cable for connection to the motor load. FIG. 17C illustrates a front cover of a motor disconnect switch, and FIG. 17D illustrates a view of the inside of the motor disconnect switch housing. FIG. 17E illustrates a lockable switch control level.

The examples provided herein for illustrative purposes have been plug connectors. However, it should be appreciated by those of ordinary skill in the art that embodiments of the present invention may be applied to switched enclosures, equipment disconnects, motor disconnect switches, and any other device which provides power to a load.

It should be appreciated by those of ordinary skill in the art that the embodiments described herein are provided for illustrative purposes and are not intended to be limiting. Additional changes and modifications may be made without departing from the scope of the invention as defined by the appended claims.

What is claimed is:

1. A device for connecting power to a load, comprising
a main housing enclosing one or more power conductors that conduct AC power from a power source outside the housing to a load device outside the housing;
one or more openings in the main housing corresponding to receptacle conductors connected to the power conductors for receiving a power connector of a load device;
at least one sensor adapted to sense a physical property of the device or a connected load;
a processor adapted to receive a signal from said at least one sensor; and
a wireless communication component adapted to communicate with a remote device.

2. The device of claim 1, wherein the sensor comprises a voltage sensor.

3. The device of claim 1, wherein the sensor comprises a current sensor.

4. The device of claim 1, wherein the sensor comprises a temperature sensor.

5. The device of claim 1, wherein the sensor comprises a moisture sensor.

6. The device of claim 1, wherein the sensor comprises a humidity sensor.

7. The device of claim 1, wherein the sensor comprises an ambient temperature sensor.

8. The device of claim 1, wherein the sensor comprises a power sensor.

9. The device of claim 1, wherein the sensor comprises a power factor sensor.

10. The device of claim 1, wherein the processor is adapted to receive sensor information from the at least one sensor, and to communicate the sensor information to the remote device via the wireless communication component.

11. The device of claim 1, wherein the processor is adapted to receive sensor information from the at least one sensor, and the processor is further programmed to compare the received sensor information with a range, and to provide an alarm to the remote device via the wireless communication component if the sensor information is outside of the range.

12. The device of claim 1, wherein the processor is adapted to receive instructions from the remote device via the wireless communication component, and to update a range based on the received instructions.

13. A device for connecting power to a load, comprising
a main housing enclosing one or more power conductors;
one or more openings in the main housing corresponding to receptacle conductors connected to the power conductors for receiving a power connector of a load device;
at least one sensor adapted to sense a physical property of the device or a connected load;
a processor adapted to receive a signal from said at least one sensor; and
a wireless communication component adapted to communicate with a remote device, further comprising an auxiliary device comprising a second housing, the second housing comprising an auxiliary sensor, the auxiliary sensor communicating auxiliary sensor information to the processor wherein the auxiliary device comprises pass-through power conductors enclosed in the second housing, the power conductors extending from the second housing at a first end, and terminating in receptacle conductors corresponding to the receptacle conductors of the main housing at a second end, such that the second housing is adapted to be connected between the main housing and the load.

14. The device of claim 13, further comprising a plurality of current sensor cores, each arranged coaxially with different power conductors.

15. The device of claim 14, wherein the plurality of sensor cores each an outer diameter substantially equal to a distance between power conductors, and the plurality cores are arranged on different axial planes.

16. The device of claim 14, wherein the plurality of sensor cores are coplanar.

17. A device for connecting power to a load, comprising
a main housing enclosing one or more power conductors that conduct AC power from a power source outside the housing to a load device outside the housing, the one or more power conductors being connected to respective contacts extending out of the housing;
at least one sensor adapted to sense a physical property of the device or a connected load;
a processor adapted to receive sensor input from the at least one sensor; and
a communication wireless component adapted to communicate with a remote device.

18. The device of claim 17, wherein the sensor comprises a voltage sensor.

19. The device of claim 17, wherein the sensor comprises a current sensor.

20. The device of claim 17, wherein the sensor comprises a temperature sensor.

21. The device of claim 17, wherein the sensor comprises a moisture sensor.

22. The device of claim 17, wherein the sensor comprises a humidity sensor.

23. The device of claim 17, wherein the sensor comprises an ambient temperature sensor.

24. The device of claim 17, wherein the sensor comprises a power sensor.

25. The device of claim 17, wherein the sensor comprises a power factor sensor.

26. The device of claim 17, wherein the processor is adapted to receive sensor information from the at least one sensor, and to communicate the sensor information to the remote device via the wireless communication component.

27. The device of claim 17, wherein the processor is adapted to receive sensor information from the at least one sensor, and the processor is further programmed to compare the received sensor information with a range, and to provide an alarm to the remote device via the wireless communication component if the sensor information is outside of the range.

28. The device of claim 17, wherein the processor is adapted to receive instructions from the remote device via the wireless communication component, and to update a range based on the received instructions.

29. A device for connecting power to a load, comprising
a main housing enclosing one or more power conductors connected to respective contacts extending out of the housing;
at least one sensor adapted to sense a physical property of the device or a connected load;
a processor adapted to receive sensor input from the at least one sensor; and
a communication wireless component adapted to communicate with a remote device,
further comprising an auxiliary device comprising a second housing, the second housing comprising an auxiliary sensor, the auxiliary sensor communicating auxiliary sensor information to the processor, wherein the auxiliary device comprises pass-through power conductors enclosed in the second housing, the power conductors extending from the second housing at a first end, and terminating in receptacle conductors corresponding to the receptacle conductors of the main housing at a second end, such that the second housing is adapted to be connected between the main housing and the load.

30. The device of claim 29, further comprising a plurality of current sensor cores, each arranged coaxially with different power conductors.

31. The device of claim 30, wherein the plurality of sensor cores each an outer diameter substantially equal to a distance between power conductors, and the plurality cores are arranged on different axial planes.

32. The device of claim 30, wherein the plurality of sensor cores are coplanar.

* * * * *